(12) United States Patent
Trépanier

(10) Patent No.: US 12,347,199 B1
(45) Date of Patent: Jul. 1, 2025

(54) COINCIDENCE IDENTIFICATION TOOL

(71) Applicant: GENETEC INC., St-Laurent (CA)

(72) Inventor: Jean-David Trépanier, St-Hubert (CA)

(*) Notice: Subject to any disclaimer, the term of this patent is extended or adjusted under 35 U.S.C. 154(b) by 593 days.

(21) Appl. No.: 17/469,651

(22) Filed: Sep. 8, 2021

(51) Int. Cl.
*G06V 20/52* (2022.01)

(52) U.S. Cl.
CPC .................... *G06V 20/52* (2022.01)

(58) Field of Classification Search
CPC ...... G08G 1/0969; G08G 1/202; G08G 1/205; G06F 3/04845; G06F 3/04847; G06F 3/04842; G06F 3/04817; G06F 3/0482; G06F 3/0488; H04M 11/04; G08B 25/016
See application file for complete search history.

(56) References Cited

U.S. PATENT DOCUMENTS

| | | |
|---|---|---|
| 5,617,114 A | 4/1997 | Bier et al. |
| 6,377,276 B1 | 4/2002 | Ludtke |
| 6,647,200 B1 | 11/2003 | Tanaka |
| 6,680,739 B1 | 1/2004 | Robertus et al. |
| 6,734,873 B1 | 5/2004 | Herf et al. |
| 6,985,149 B2 | 1/2006 | Peercy et al. |
| 7,477,264 B2 | 1/2009 | Grigorovitch et al. |
| 7,579,965 B2 | 8/2009 | Bucholz |
| 7,623,140 B1 | 11/2009 | Yeh et al. |
| 7,716,685 B2 | 5/2010 | Schechter et al. |
| 7,925,978 B1 | 4/2011 | McGavran et al. |
| 8,305,398 B2 | 11/2012 | Finger et al. |
| 8,811,499 B2 | 8/2014 | Moote et al. |
| 8,913,067 B1 | 12/2014 | Kokkevis |
| 9,031,948 B1 | 5/2015 | Smith |
| 9,361,546 B1 | 6/2016 | Smith |
| 9,852,606 B1 | 12/2017 | Heier et al. |
| 10,460,602 B1 | 10/2019 | Dome et al. |
| 10,885,066 B2 | 1/2021 | Lawlor et al. |
| 11,036,997 B2 | 6/2021 | Yigit et al. |
| 2005/0088436 A1 | 4/2005 | Swedberg et al. |
| 2007/0240232 A1 | 10/2007 | Pino et al. |
| 2009/0256859 A1 | 10/2009 | Moote et al. |
| 2010/0033504 A1 | 2/2010 | Hart, II et al. |

(Continued)

FOREIGN PATENT DOCUMENTS

| | | |
|---|---|---|
| WO | 96/31984 A1 | 10/1996 |
| WO | 2009/143294 A2 | 11/2009 |
| WO | 2014/162239 A2 | 10/2014 |

OTHER PUBLICATIONS

Vallejo et al, A multi-agent architecture for supporting distributed normality-based intelligent surveillance, Engineering Applications of Artificial intelligence 24(2011)325-340 (Year: 2011).*

(Continued)

*Primary Examiner* — Andrae S Allison
(74) *Attorney, Agent, or Firm* — Anglehart et al.

(57) ABSTRACT

User input is used to define different geographical locations and/or different time frames related to a plurality of events, At least one data source is queried to receive occurrence records corresponding to at least some of the plurality of events according to the different geographical locations and/or different time frames. The records having at least one field whose value matches are grouped to form at least one coincidence entity. A visual representation of the at least one coincidence entity is presented to the user.

20 Claims, 14 Drawing Sheets

(56) References Cited

U.S. PATENT DOCUMENTS

| | | |
|---|---|---|
| 2010/0278509 A1 | 11/2010 | Nagano et al. |
| 2010/0313156 A1 | 12/2010 | Louch et al. |
| 2011/0074765 A1 | 3/2011 | Oterhals et al. |
| 2012/0306912 A1 | 12/2012 | Blanco et al. |
| 2013/0002864 A1 | 1/2013 | Lundberg |
| 2013/0038794 A1 | 2/2013 | Ackley et al. |
| 2013/0063445 A1 | 3/2013 | Blanco et al. |
| 2013/0129324 A1 | 5/2013 | Uro et al. |
| 2013/0205308 A1 | 8/2013 | Constable et al. |
| 2013/0246576 A1 | 9/2013 | Wogsberg et al. |
| 2014/0072270 A1 | 3/2014 | Goldberg et al. |
| 2014/0254879 A1 | 9/2014 | Smith |
| 2015/0097919 A1 | 4/2015 | Karimi-Cherkandi et al. |
| 2016/0048636 A1 | 2/2016 | Warner et al. |
| 2016/0078037 A1* | 3/2016 | Ziezold ............ G06F 16/24578 707/728 |
| 2016/0148421 A1 | 5/2016 | Friend |
| 2016/0371553 A1* | 12/2016 | Farnham, IV ........... G08G 1/04 |
| 2017/0013226 A1 | 1/2017 | Trepanier |
| 2019/0007377 A1* | 1/2019 | Bender ............... H04L 12/1895 |
| 2019/0164245 A1 | 5/2019 | Takacs |
| 2019/0197727 A1* | 6/2019 | Konishi ............... G06V 10/751 |
| 2019/0361951 A1* | 11/2019 | Jayavelu ............ G06F 16/9536 |
| 2019/0373205 A1 | 12/2019 | Trepanier |
| 2021/0019645 A1 | 1/2021 | Petrey, Jr. |
| 2022/0326902 A1* | 10/2022 | Raucher .............. H04M 7/0027 |
| 2023/0049959 A1* | 2/2023 | Schroeder ........... G06F 3/04817 |

OTHER PUBLICATIONS

Saykol et al, Scenario-based query processing for video-surveillance archive, Engineering Applications of Artificial Intelligence 23 ( 2010) 331-345 (Year: 2010).*
Stonebraker, Michael, et al. "Surveillance video querying with a human-in-the-loop." Proceedings of the Workshop on Human-In-the-Loop Data Analytics with SIGMOD. 2020. (Year: 2020).*
International application No. PCT/2016/050779 International Preliminary Report on Patentability Chapter I dated Jan. 9, 2018.
International application No. PCT/2016/050779 International Search Report dated Oct. 6, 2016.
International application No. PCT/2016/050779 Search Strategy dated Oct. 6, 2016.
International application No. PCT/2016/050779 Written Opinion of the International Searching Authority dated Oct. 6, 2016.
European application No. 16820598.7 the extended European search reportdated Nov. 27, 2017.
European application No. 16820598.7 the extended European search reportdated Sep. 17, 2018.
European application No. 16820598.7 the extended European search reportdated Sep. 13, 2019.
Aliaga, Daniel G., Martin Brenner, and Matthias Schneider-Hufschmidt. Implementation of Graphing Tools by Direct GUI Composition.
Design Plans for Out-of-Process iframes http://www.chromium.org/developers/design-documents/oop-iframes.
GPU Accelerated Compositing in Chrome http://www.chromium.org/developers/design-documents/gpu-accelerated-compositing-in-chrome.Updated May 2014.
Kühme, Thomas, and Matthias Schneider-Hufschmidt. "Direct Composition of Adaptable Multimedia User Interfaces." Innovative Programmiermethoden für Graphische Systeme (1992): 97-110 (abstract).
Schneider-Hufschmidt, Matthias. "Designing user interfaces by direct composition: prototyping appearance and behavior of user interfaces." User-Centred Requirements for Software Engineering Environments (1994): 235-251 (abstract).
Prototyping of Graphing Tools by Direct GUI Composition—an Experience Report Daniel G. Aliaga, Matthias Schneider-Hufschmidt Requirements Engineering '93: Prototyping Berichte des German Chapter of the ACM 1993, pp. 317-334 (abstract).
Brenner, Martin. "Designing Multimedia User Interfaces by Direct Composition." Multimedia. Springer Berlin Heidelberg, 1994. (abstract).
Willis, James J., et al., "The adaptation of license-plate readers for investigative purposes: Police technology and Innovation re-invention." Justice quarterly 35.4 (2018): 614-638.
Koper, Christopher S., et al., "The impacts of large-scale license plate reader deployment on criminal investigations." Police Quarterly 22.3 (2019): 305-329.
M. Merola, L., Lum, C., Cave, B. and Hibdon, J. (2014), "Community support for license plate recognition", Policing: An International Journal, vol. 37 No. 1, pp. 30-51.

* cited by examiner

COINCIDENCE IDENTIFICATION TOOL

TECHNICAL FIELD

This patent application relates to data processing, and more particularly to correlation of database data.

BACKGROUND

Whereas "data mining" is a process for identifying trends and patterns in large data sets, "coincidence identification" refers to identifying a pattern of a relatively small number of events through the identification of a common data field across a number of records in a database. Computer systems that perform or enable coincidence identification are useful tools for law enforcement or facility security investigators.

SUMMARY

Applicant has discovered that coincidence identification is improved by providing an interface giving the user the ability to select parameters for events and/or parameters of a common data field. In this way, a user, such as an investigator, can appreciate how coincidence identification changes with different selections of parameters of the common data field and/or difference data source selections.

In some embodiments of the proposed solution, a computer-implemented method of processing occurrence records for coincidence identification comprises receiving user input used to define one or both of different geographical locations and different time frames related to a plurality of events, querying at least one data source to receive occurrence records corresponding to at least some of the plurality of events according to at least said one or both of different geographical locations and different time frames of said plurality of events, grouping said occurrence records having at least one field whose value matches to form at least one coincidence entity, and displaying to a user a visual representation of said at least one coincidence entity.

The user input may include a coincidence match mode for said at least one field, and said grouping comprises matching values of said at least one field in accordance with said coincidence match mode. The user input may include defining said different geographical locations related to said plurality of events. The user input may define said at least one field. The at least one field defined by user input may be used to identify said at least one data source. The querying may comprise broadcasting queries to said at least one data source and processing data returned from said at least one data source.

In some embodiments, the method may further comprise repeating said receiving, said querying, said grouping and said displaying with refined user input for at least one of: said different geographical locations; different time frames; and said at least one field. The method may also further comprise receiving user input to hide said visual representation of at least one of said at least one coincidence entity.

The displaying to a user a visual representation of said at least one coincidence entity may comprise presenting a map. The displaying may comprise placing a symbol on said map corresponding to said at least one data source at a location associated with said occurrence records of said at least one coincidence entity. The symbol may include a balloon containing details from said occurrence records of said at least one coincidence entity. The displaying may comprise placing a boundary marker of said different geographical locations related to said plurality of events on said map. The displaying may comprise placing, on said map, one or more markers corresponding to sensor locations defined by said at least one data source of said boundary marker of said different geographical locations related to said plurality of events, said markers helping the user choose said different geographical locations related to said plurality of events.

The at least one data source may comprise two or more data sources. The querying may comprise broadcasting queries to said two or more data sources and processing data returned from said two or more data sources. The grouping may comprise matching values of said at least one field of at least a first occurrence record from a first data source of said two or more data sources with at least a second occurrence record from a second data source of said two or more data sources.

In some embodiments, there is provided a computer-readable non-transitory memory storing instructions executable by a computer device to perform the method.

BRIEF DESCRIPTION OF THE DRAWINGS

The invention will be better understood by way of the following detailed description of embodiments of the invention with reference to the appended drawings, in which:

FIG. 5A is an example of graphical user interface event definition panel;

FIG. 5B is an example of graphical user interface coincidence field definition panel;

DETAILED DESCRIPTION

Figure 1:
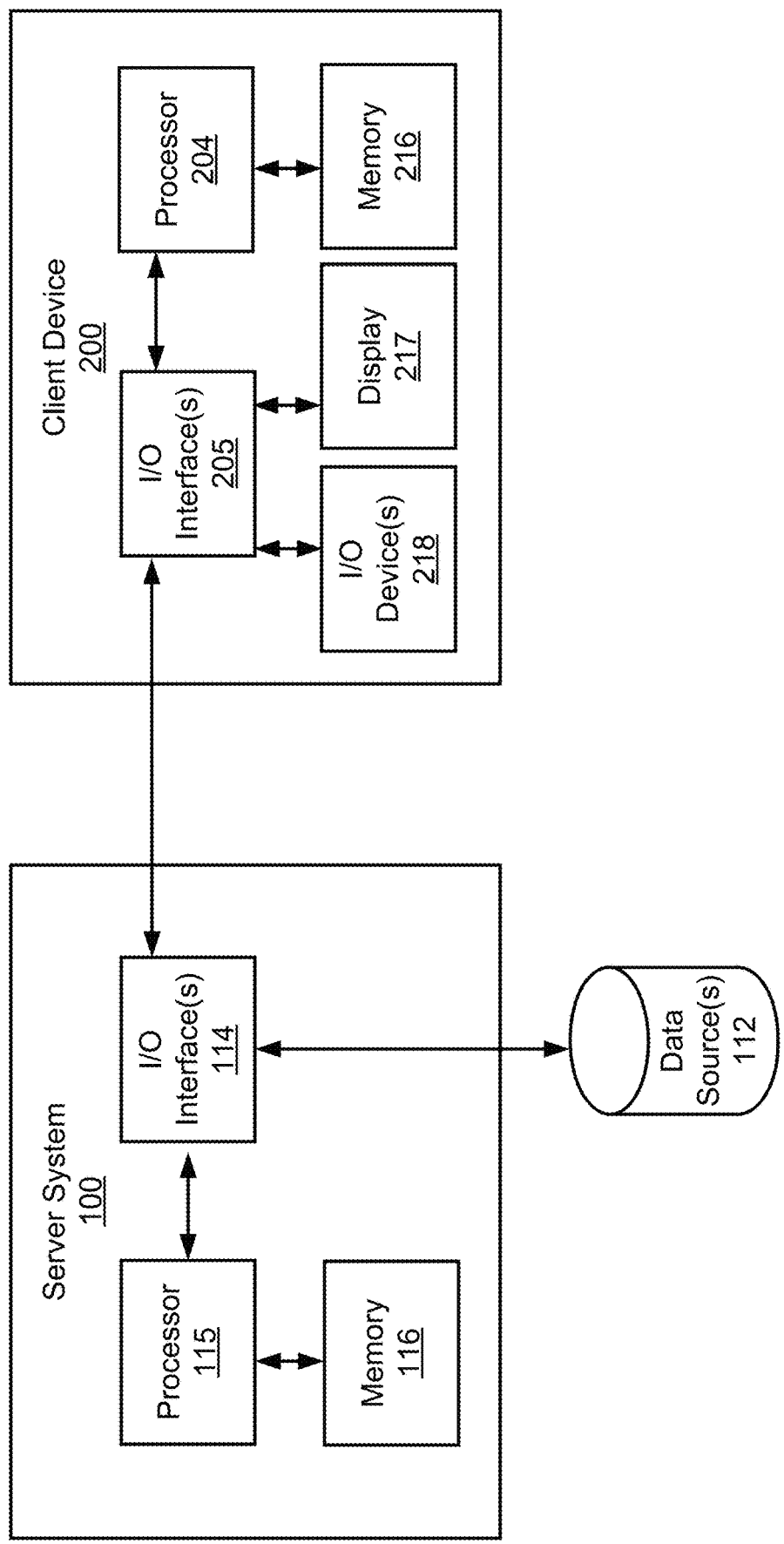
FIG. 1 is a schematic diagram illustrating an example environment comprising a server system in communication with one or more data sources and a client device.

The term "occurrence record" refers to information indicative of an event stored by a data source that may be accessed or obtained from the data source. The data source may be or may comprise a database that stores occurrence records. The occurrence record has an occurrence record type, and may have a time parameter and a geographical parameter. The occurrence record may have other metadata and data associated with additional parameters. The data structure of the occurrence record may depend upon the configuration of the data source and/or database in which the occurrence record is stored. Examples of occurrence records are access control ID reads and times, surveillance video analytics, license plate reads associated with a time and geographical parameter, the identity of a registered criminal with a location of the criminal, 911 call events with a time parameter, geographical parameter, a narrative, and/or a priority value; a gunshot event associated with the picking up of a sound that is identified to be a gunshot having a time parameter, a geographical parameter and perhaps the identification of the firearm, the positioning of a bus at a given time, an identified construction site blocking street access with a time parameter and a geographical parameter, a traffic accident event with a time parameter and a location parameter, etc.

The term "time parameter" refers to a parameter specifying time, such as timestamp, a time interval (or a period of time). Each occurrence record may have one or more time parameters associated therewith.

The term "geographical parameter" refers to a location, such as the GPS coordinates. The geographical parameter may also be a location range or an area defined by a set of coordinates. Each occurrence record may have one or more geographical parameters associated therewith.

The term "occurrence record type" refers to the nature or type of the occurrence record. For example, the occurrence record type may be one of an access control event, motion detection event, surveillance video analytics event, a 911 call, the identity of a known criminal, a gunshot event, a license plate read event, etc. Data sources and/or databases storing occurrence records may be associated with an occurrence record type.

The term "query" refers to a request for information from a data source and/or database. The query may include an occurrence record type or types, one or more time parameters and one or more geographical parameters. The query may specify additional parameters as a function of the occurrence record type. For instance, when the occurrence record type is a database of convicts, the additional parameters may be convicts that have been charged with third degree murder, or convicted with third degree murder, or that are under the age of 25, that have blond hair, blue eyes, etc. The time parameter may be a defined time, or time range (e.g. in the two years preceding the date of the query). The geographical parameter may be a specific location (e.g. a set of coordinates), or an area (e.g. defined by a plurality of sets of coordinates).

With reference to FIG. 1, there is illustrated an example environment comprising a system 100 in communication with one or more data sources 112. The system 100 may be, a server-based system (as shown in FIG. 1), in communication with one or multiple client devices 200. The system 100 may be an area monitoring system, such as the one described in U.S. Pat. No. 10,885,066, the contents of which are hereby incorporated by reference.

The system 100 has at least one processor 115, memory 116 and at least one input/output interface 114 for communication with one or more data sources 112, and/or an input/output interface 205 of the client device 200. The one or more data sources 112 may be one or more external database(s), one or more external systems, for example, having one or more databases, that are accessibly via Application Programming Interface (API) calls, and/or one or more local databases that are part of the system 100.

The system 100 may have an interface 114 for each of the data source 112. A separate I/O interface 114 may also be provided in system 100 for communicating with the I/O interface 205 of the client device 200.

The processor 115 may be a general-purpose programmable processor. In this example, the processor 115 is shown as being unitary, but the processor may also be multicore, or distributed (e.g. a multi-processor).

The computer readable memory 116 stores program instructions and data used by the processor 115. The computer readable memory 116 may also store locally occurrence records, acting as a local database. The memory 116 may also stores information regarding the data source(s) 112 that are accessible by the system 100, such as the identity of the data sources, the configuration type of the data sources, the occurrence record type of the data sources, etc. (i.e. the database attribute data structures). The computer readable memory 116, though shown as unitary for simplicity in the present example, may comprise multiple memory modules and/or caching. In particular, it may comprise several layers of memory such as a hard drive, external drive (e.g. SD card storage) or the like and a faster and smaller RAM module. The RAM module may store data and/or program code currently being, recently being or soon to be processed by the processor 115 as well as cache data and/or program code from a hard drive. A hard drive may store program code and be accessed to retrieve such code for execution by the processor 115 and may be accessed by the processor 115 to store and access data. The memory 116 may have a recycling architecture for storing, for instance, occurrence records, data source and/or database coordinates, where older data files are deleted when the memory 116 is full or near being full, or after the older data files have been stored in memory 116 for a certain time.

The I/O interface 114 is in communication with the processor 115. The I/O interface 114 may comprise a network interface and may be a wired or wireless interface for establishing a remote connection with, for example, a remote server, an external data source 112, the client device 200, etc. For instance, the I/O interface 114 may be an Ethernet port, a WAN port, a TCP port, etc.

The processor 115, the memory 116 and the I/O interfaces 114 may be linked via bus connections.

The data source(s) 112 may be one or more remote server(s) comprising one or more databases. A data source 112, and in particular a database, may contain occurrence records, information, corresponding to at least one occurrence record type.

In some examples, the system 100 may have a local database stored, e.g., in memory 116, that contains occurrence records of at least one occurrence record type.

The client device 200 may be a remote computing device (i.e. client). The client device 200 is in communication with the I/O interface 114 of the system 100. The computing device 200 has a processor 204, a memory 216, an I/O interface 205 that may be linked via bus connections. The computing device 200 may have (or be connect to) any suitable I/O device(s) 218, for example, such as a keyboard, a mouse, etc. The computing device 200 may be a desktop computer, a laptop, a smartphone, a tablet, etc. The computing device 200 has (or is connect to) a display 217 (e.g. a screen, a tactile display, etc.). The processor 204, the memory 216 and the I/O interface(s) 205 may be similar to the processor 115, the memory 116 and the I/O interface(s) 114, respectively.

A client application program may be stored in memory of the computing device 200 that is associated with the system 100, the client application program providing the user with an interface to interact with the system 100.

In some embodiments, the system 100 may include at least one computing device 200, where, for instance, the connection between the system 100 and the computing device 200 may be a wired connection. In some embodiments, the functionality of the system 100 and the client device 200 may be implemented on a single computing device.

Figure 2:
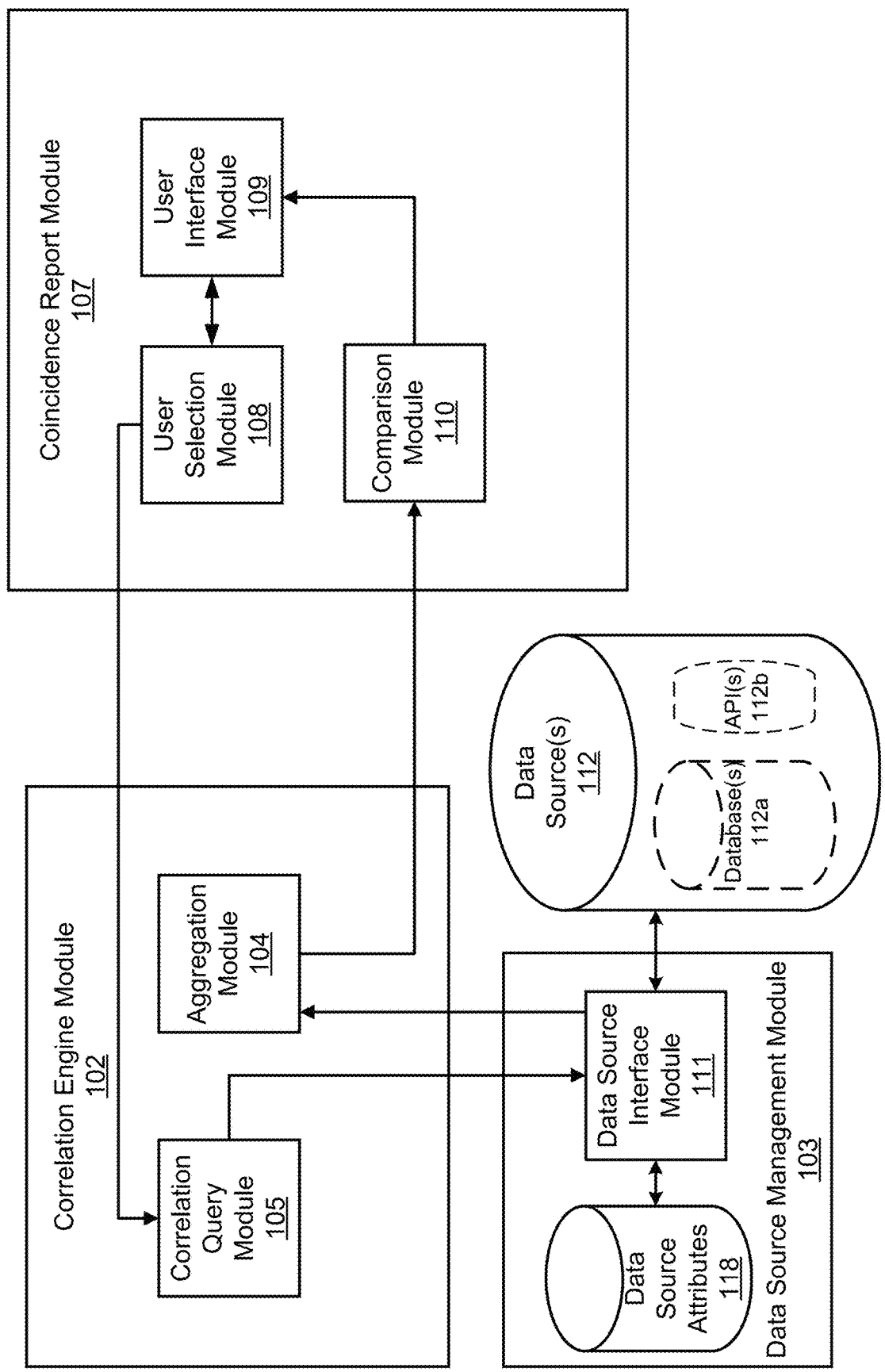
FIG. 2 is a schematic block diagram illustration functional blocks of the system of FIG. 1.

With reference to FIG. 2, there is illustrated an example architecture for the system 100 and the client device 200.

The system 100 has program code, stored in memory 116 that includes a correlation engine module 102 and a data source management module 103. The client device 200 has program code (i.e., the client application program), stored in memory 216 that includes coincidence report module 107. Each of the correlation engine module 102, the data source management module 103, and the data source management module 103 comprises program code configured to implement the functionality of the modules as is described in this document. In some embodiments, the correlation engine module 102, the data source management module 103 and the coincidence report module 107, may be on a single computing device.

The coincidence report module 107 may comprise various submodules, for example, such as a user interface module 109, a user selection module 108 and a comparison module 110. The data source management module 103 may comprise various submodules, for example, a data source interface module 111. The data source management module 103 may comprise as data source attributes 118, which may be a database or other data structure. The correlation engine module 102 may comprise various submodules, for example, such as a correlation query module 105 and an aggregation module 104. Each of the submodules of the correlation engine module 102, the data source management module 103, and the data source management module 103 comprises program code configured to implement the respective functionality of these submodules.

The user interface module 109 provides a graphical user interface (GUI) on the client device 200. With additional reference to FIG. 3, the GUI may comprise a map that the user may interact therewith to create or enter events, which in some embodiments may be occurrence records. It will be appreciated that events can be created by a variety of data systems without requiring operator data entry, as may be the case for an access control event, motion detection event, surveillance video analytics event, a 911 call, the identity of a known criminal, a gunshot event, a license plate read event, etc. The user may enter in different events that have occurred, for example, by selecting a location on the map. Each event comprises a least one geographical location parameter and at least one time parameter. For example, each event can include a geographical location (e.g., GPS coordinates or other geographical coordinates), a timestamp of the time (or approximate time) of the event, a boundary (e.g., a radius or other perimeter) around the geographical location of the event, and a time range around the timestamp/time of the event. By way of another example, each event could include a time window (i.e., a start and end time) and a geographical boundary (e.g., a radius or perimeter). The user may enter in the geographical location and time parameters for the events via the GUI shown in FIG. 3. The user may adjust the geographical location and/or time parameters for the different events in order to define and/or redefine parameters for the search for common occurrences or coincidences.

Figure 4A:
FIG. 4A is an example of graphical user interface event definition panel.
Figure 4B:
FIG. 4B is an example of graphical user interface coincidence field definition panel.
Figure 4C:
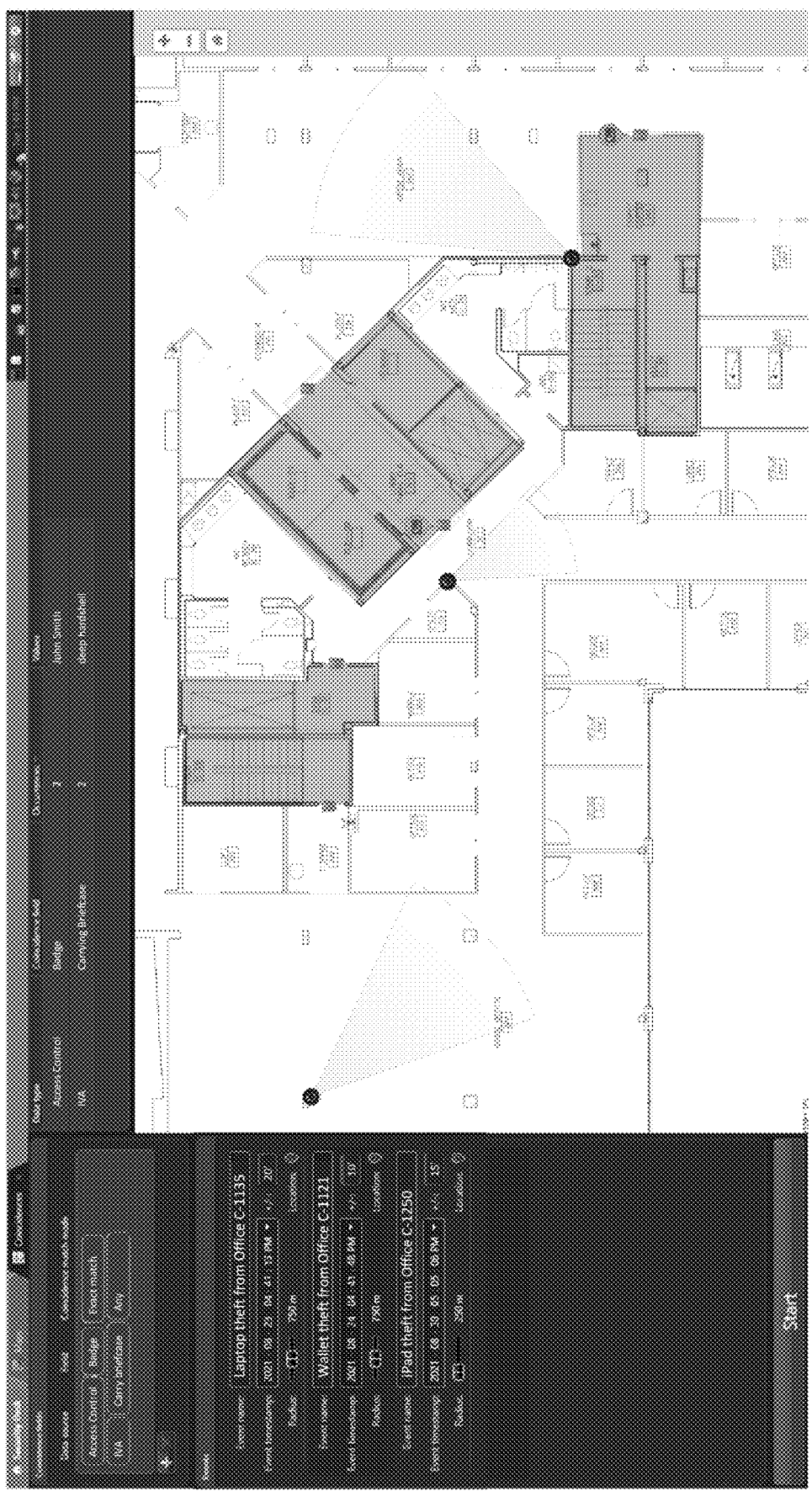
FIG. 4C an example of a graphical user interface having an event definition panel, coincidence field definition panel, a coincidence entity panel, and map.

With reference to FIGS. 4A and 4B, in some embodiments, the user may enter in different events and one or more data fields pertaining to the occurrence records that are to be searched. The data fields may comprise a record type, a field name and a comparison method or a coincidence match mode. For example, three events of office thefts are selected by the user in module 108 as shown in FIG. 4A. A laptop, wallet and Pad were reported stolen in recent weeks at different facility locations, and the investigator may select from an event database the three events or may manually enter the three events. The different event times (with their ranges of +/−a selected number of minutes) and locations of the events can be specified using interface 108 as shown in FIG. 4A. The data fields that are to be used for identifying the coincidence events may also be specified by the user in module 108 as shown in FIG. 4B. In this example, the areas selected are used to define access control readers and surveillance cameras of the access control system database and the intelligent video analytics system selected in FIG. 4B. While video analytic results can be stored in a database, the intelligent video analytics system can retrieve archived video for the surveillance cameras within the event region within the event timeframe, perform the desired video analytics and then provide the result. The user can also specify the coincidence match modes. For example, badges should match identically, while the field of interest from video analytics has been chosen as an automated image analysis recognition of briefcase carrying since there have been reports of unrecognized people seen carrying briefcases that may coincide with the thefts. The type of the briefcase was never clearly identified, so the type of hand-carried bag is left to any type. FIG. 4C illustrates schematically a possible form of the interface 109 in the present example.

While this example shows events on a same floor of a building, it will be understood that the map displayed can be partitioned to show different floors or portions of different buildings of a facility, for example tiled on the same screen or tabbed for individual viewing. In the case of an airport facility or a campus, indoor and outdoor areas of terminals may be displayed. In some embodiments, the map of a building or campus may include multiple floors. The investigator can benefit from the visual presentation of occurrences that have common field data. For example, badge reader data may illustrate movement of the person in and out of an area. The video analytics data may show detection at multiple times within the selected time frame, indicating that the person was circulating within the premises. This information, whether reported by text or visually, is helpful to investigators to determine whether the coincidence is worthy of further investigation.

Figures 5A, 5B:
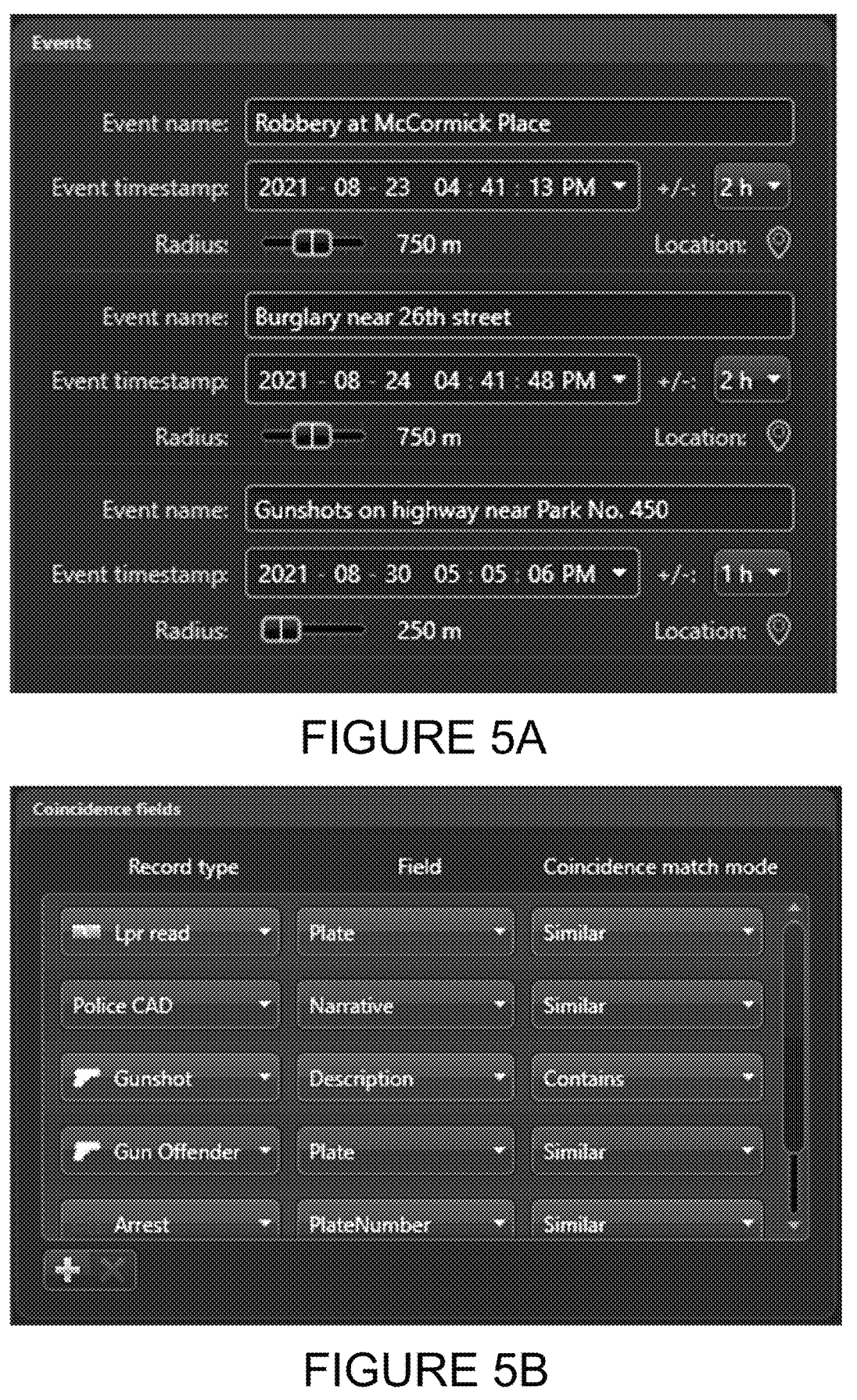
Figure 5C:
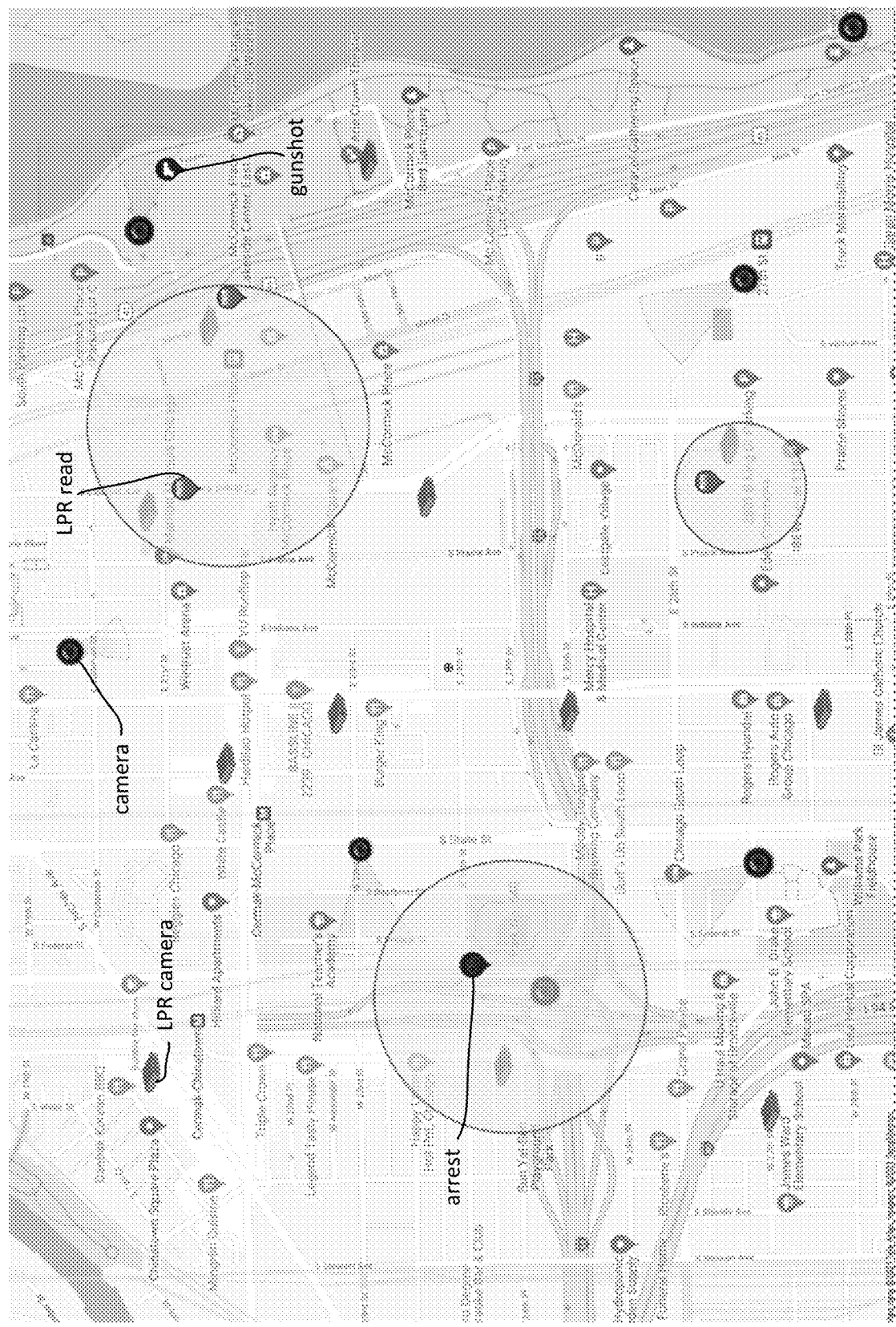
FIG. 5C is an example of a graphical user interface map showing data source sensor locations, event location areas and symbols representing occurrence record locations from different data sources.

In a different example, as shown in FIGS. 5A through 5F, coincidence identification system is applied to urban area monitoring. In FIG. 5A, the user selected three event records, namely a robbery, a burglary and a gunshot event.

These events are defined by different times and locations/areas. In FIG. 5B, the user may select the data sources, the field and the coincidence match mode. In this example, the data sources 112 are license plate recognition (LPR) read, Police CAD (computer aided dispatch), Gunshot events, Gunshot offenders and Arrests. The respective fields of these data sources are plate, narrative, description, plate and Plate Number as shown in FIG. 5B. The user can then select a comparison method (also referred to as a "coincidence match mode" in this document). For example, the comparison method can be exact match, contains, starts with, ends with, similar. In this example of FIG. 5B, the user selects similar for the LPR read source. The similar method is selected in this example, as the similar method can be used a string distance algorithm or OCR equivalence in case of LPR plate misreads (e.g., an "8" is misread as a "B").

Referring back to FIG. 2, the user selection module 108 obtains the user's selections of the events and their corresponding geographical and time parameters and the user's selections for the one or more fields (if provided or available). The user selection module 108 provides the user's selections to the correlation engine module 102, and in particular the correlation query module 105. The user's selection may be provided to the correlation query module 105 in the form of a correlation query. The correlation query may indicate which types of records to query and geographical and time parameters. The correlation query is generated based on the user's selection. For example, if the user has selected LPR read as the record type, the correlation query may be generated to indicate that all LPR read data sources available to the system 100 should be queried. Similarly, the correlation query may be generated to indicate the geographical and time parameters of the events.

The correlation query module 105 receives the user's selections provided by the user selection module 108. The correlation query module 105 transmits or broadcasts the query or queries to the data source management module 103, and in particular the data source interface module 111.

The data source interface module 111 receives the correlation query in a native format of the system 100, adapts the format of data, query or queries transmitted to a data source 112 (e.g., a database 112a) to the format and/or configuration of the specific data source 112. The data source interface module 111 may also adapt the format and/or properties of the occurrence records transmitted from the data source 112 such that they may be received and analyzed by the correlation engine module 102. In some examples, the data source interface module 111 may be an application programming interface (API) for interfacing with an API 112b of an external data source.

The data source attributes database 118 contains information on the different data sources 112 that may be queried by the system 100. A data source attribute data structure for each data source (e.g., database or API) that may be queried by the system 100 may be stored in the data source attribute database 118. The data source attribute data structure (e.g. a record) for each data source 112, stored in the database attributes database 118 may contain, but is not limited to: the configuration of the data source (the properties of the database or API); the occurrence record type stored in the database; a list of fields stored in an occurrence record stored (e.g. for a criminal database: a string for the eye colour, a string for the height, the hair colour, an age which is an integer; date of registration in the database which is a timestamp, etc.); a time value indicative of when the data source was added to the data source attribute database 118; the identity of the data source in charge of the database (i.e. in the case of an external database, the database may be managed by an entity other than the one managing the system 100); and/or the coordinates of the data source (e.g. a GUID that e.g., identifies the role of the database in the system 100). Additionally, the data source attributes store 118 may contain information about how to render the record in the user interface 109, for example icons, text and fields to display.

The data source attributes 118 produces a mapping of the different data source 112, where the mapping can be accessed by the data source management module 103 to identify the data source 112 to be queried as a function of a correlation query.

The data source interface module 111 may receive the various coordinates for the data source 112 to be queried and generate a query to be transmitted to the data source 112 corresponding to the query.

The data source interface module 111 may be part of the correlation engine module 102, or may be separate from the correlation module 102. The data source interface module 111 may be part of the correlation query module 105 or the functionality of the data source interface module 111 may be implemented by the correlation query module 105. There may be data source interface module 111 for each of the data source 112 that can be queried by the system 100. The data source interface module 111 receives the query from the correlation query module 105 and adapts the query to the format of the data sources 112 to be queried. This is because each data source may have specific properties and configurations, and the query generated by the correlation query module 105 may not be compatible with the external data sources 112. The data source interface module 111 then transmits the adapted query to the data sources 112.

Each query generated may include the occurrence record type to be queried. Each query generated may include one or more time parameters to further limit the occurrence records retrieved by processing the query to those that correspond to the time parameter(s), for example that have been recorded on or within the time parameter, namely a point in time, a time range, etc. Each query may also include a geographical parameter to further limit the occurrence records retrieved by processing the query to limit search results to those that correspond to the geographical parameter, where the geographical parameter may be, e.g. a specific set of coordinates defining a precise location, an area, perimeter, or region defined by a set of sets of coordinates, a specific set of coordinates defining a precise location and a radius value indicative of a radius around the precise location, etc. It will be understood that the query may include other parameters to further identify the occurrence records to be retrieved by processing the query.

The data source interface module 111 may also receive a set of occurrence records from the data source(s) 112 corresponding to the query (or queries) and transmit the set of occurrence records to the aggregation module 104, such that the aggregation module 104 may process the set of occurrence records and/or verify the conditions of the correlation query based on the set of occurrence records. The occurrence records from the data source(s) 112 typically correspond to records meeting the one or more time parameters and/or one or more geographical parameters of the query or queries, and as such verification that the conditions of the correlation query is met may not be needed. For example, each event selected by the user may have a corresponding query with time and/or geographical parameters and a corresponding set of occurrence records meeting those time and/or geographical parameters. By way of example, there may be three queries generated for the three events specified in FIG. 3, where each query comprises a time parameter (e.g., a time range) and a geographical parameter (e.g., a geographical coordinates of a specific location and a radius value of a radius around the specific location), and there may be three corresponding sets of occurrence records each meeting the time parameter and the geographical parameter of the three queries, respectively. By way of another example, a single query may be generated for multiple events specifying the different time and/or geographical parameters of the different events and a set of occurrence records is received that comprises records that meet the conditions of the query. By way of yet another example, a query may be generated for each data source, and each data source may return a set of occurrence records meeting the conditions of its query.

The aggregation module 104 may process the received set or sets of occurrence records from the queried data sources(s) 112 as a function of the conditions of the correlation query. The aggregation module 104 may generate an aggregated dataset from the set or sets of occurrence records. The aggregation module 104 provides the aggregated dataset of occurrence records to the comparison module 110.

The aggregation module 104 then receives records from the one or more data sources that correspond to the different events, either by time frame, by geographical location or both. The comparison module 110 then invokes the coincidence match mode selected by the user for each one of the one or more fields that the user has selected. The resulting records are presented to the user. For example, FIG. 5C illustrates how a map can be used with graphical symbols to show coincidence occurrences and the user-selected regions. In this example, the user-selected search regions from each of the selected events are circular regions defined by a location and radius. Regions can be alternatively selected by defining areas using polygons or selection rules. Regions may be shown on the map as boundary markers.

The map in FIG. 5C also illustrates by placing symbols on the map the location of the LPR readers, gunshot detectors and surveillance cameras outside of the selected regions. The symbols are related to the data sources. This gives the user information that can be used to guide further or future region selections.

Figure 5D:
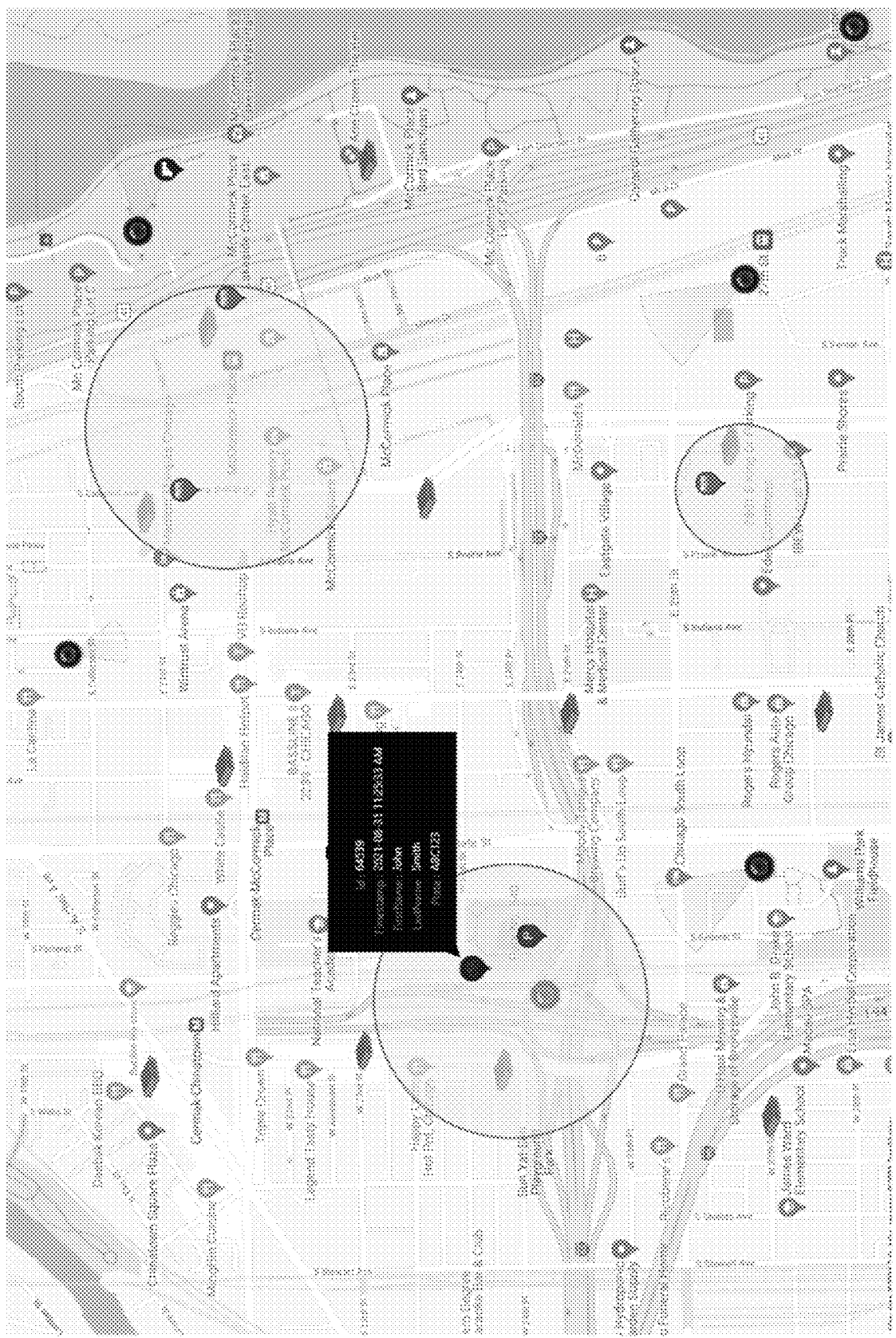
FIG. 5D is an example of a graphical user interface map showing data source sensor locations, event location areas and symbols representing occurrence record locations from different data sources with a balloon providing details of one of the occurrence records.

FIG. 5D illustrates an example of how the user can select an icon on the map to see the details of the record, for example in a balloon as shown or in a separate tile or window of the display, in this case details of an arrest record containing a license plate number, namely the field whose data is to be matched with other records related to the event.

Figures 5E, 5F:
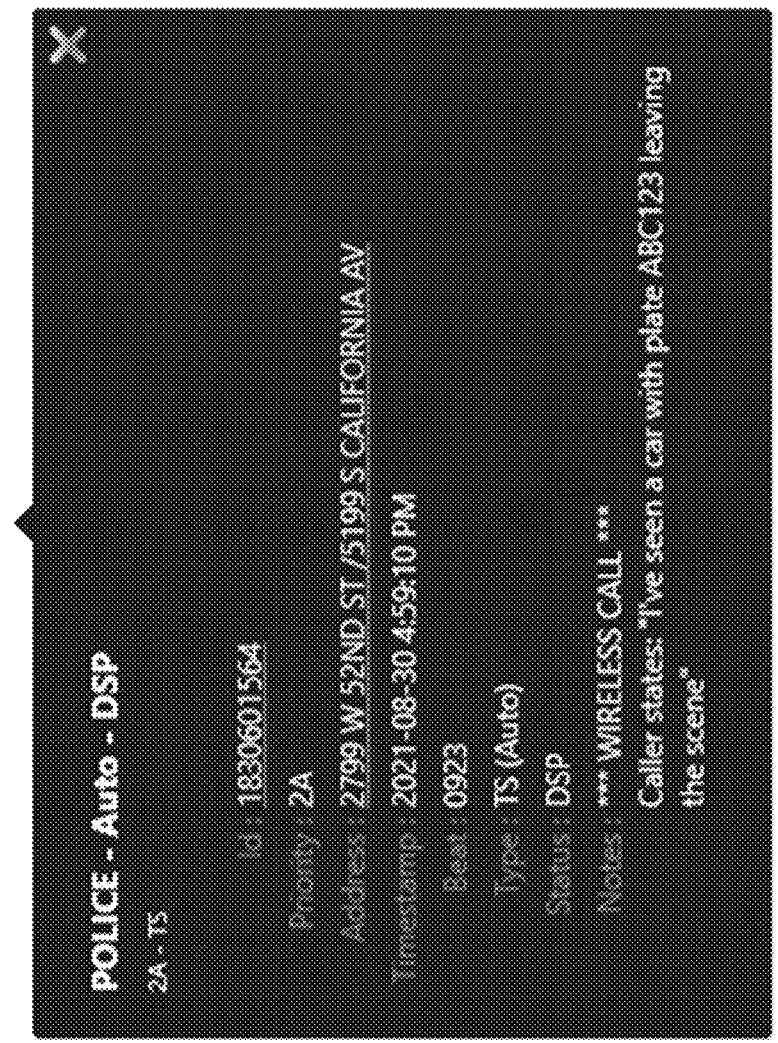
FIG. 5E is an example of a balloon providing details of an occurrence record.
FIG. 5F is an example of a coincidence entity panel.

FIG. 5E is an illustration of a police CAD record in the notes or narrative of which a reference is made to a license plate number. Fire CAD records can also be a similar data source in which fields can be matched with fields in other data sources. In FIG. 5F, two common values are found in the data sources that meat the coincidence match mode criteria, namely FGN6751 and ABC 123 that correspond to license plate numbers. For FGN6751, there are a total of 5 occurrences from across three data sources, whereas for ABC 123, there are two occurrences from only one data source. While a summary table as in FIG. 5F can be presented in a portion of the user interface, as is the case in the upper right side of the interface of FIG. 5G, the information may also be limited to the graphical information, if desired.

Figure 5G:
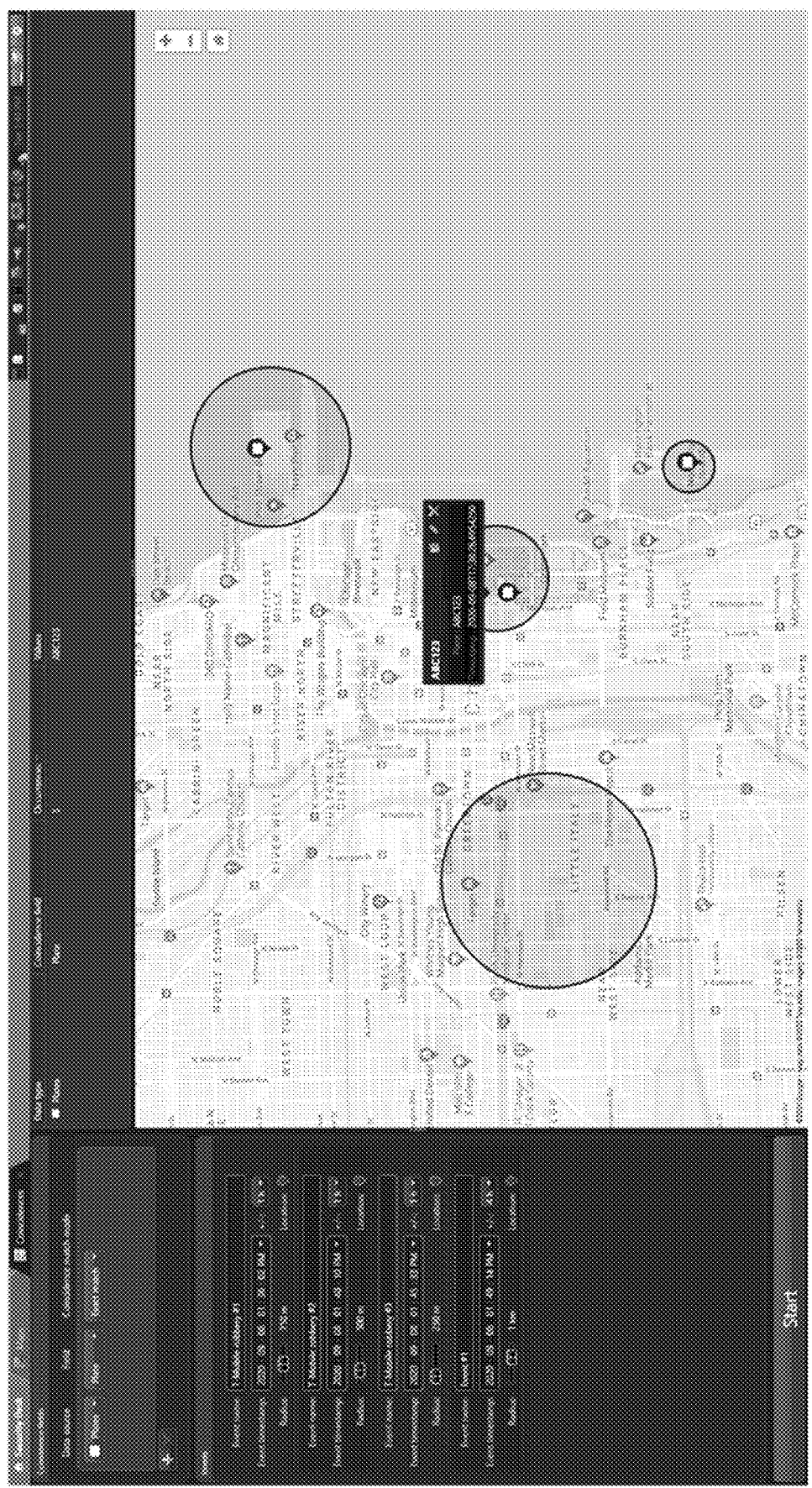
FIG. 5G is an example of a graphical user interface having an event definition panel, coincidence field definition panel, a coincidence entity panel, and map showing event location areas and symbols representing occurrence record locations with a balloon providing details of one of the occurrence records.
Figure 5H:
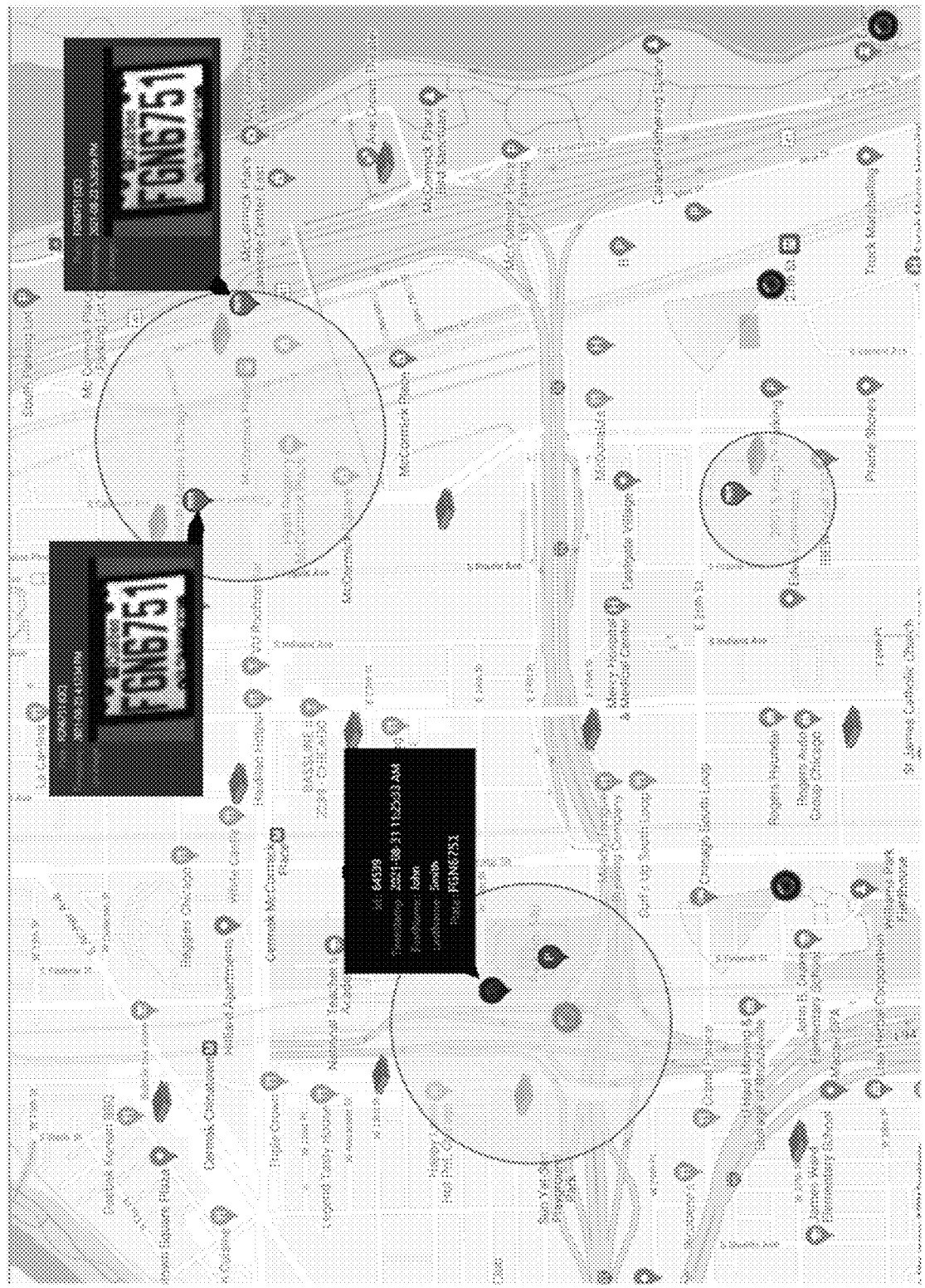
FIG. 5H is an example of a graphical user interface map showing data source sensor locations, event location areas and symbols representing occurrence record locations from different data sources with balloons providing details of occurrence records.

Moreover, the interface may also accept user input to hide any one or more of the matching values, either from the table of FIG. 5F or from the map (see FIG. 5G), so that the presentation of the coincidence data is restricted by the user input. This can help the user concentrate on a single coincidence without needing to adapt the event or field selections to focus on a single coincidence. FIG. 5H illustrates an example where the user hides the selection of the value ABC 123.

The interface may allow the user to inspect details of one or more of the occurrence records in the aggregated dataset. For example, in the context of LRP records, the user may check to see if the make, model, and/or colour of the car in the LPR records are the same.

Figure 3:
FIG. 3 is an example of a graphical user interface having an event definition panel and map.
Figure 6:
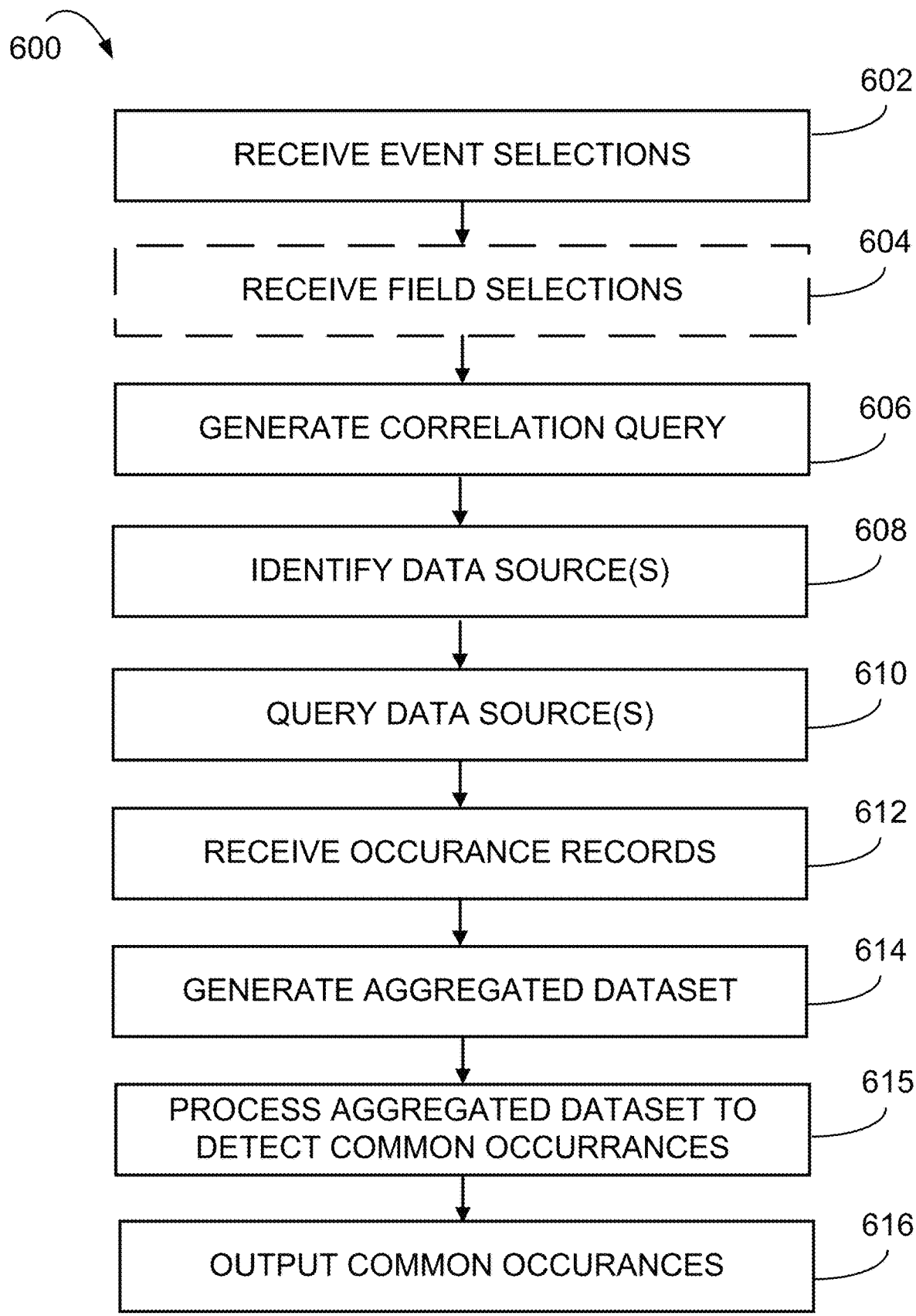
FIG. 6 is a flowchart illustrating an example method for generating a coincidence report.

With reference to FIG. 6, there is shown a flowchart illustrating an example method 600 for generating a coincidence report. At step 602, event selections are received. Events may be directly taken from actual event records in one or more databases, or they may be based on knowledge of events that the investigator has without connection to specific data sources containing the event records. The event selection may define only a time frame, only a geographical location, or both. Event selection is also illustrated in the examples of FIGS. 3, 4A and 5A. Accordingly, in one or more embodiments, step 602 comprises receiving user input used to define one or both of different geographical locations and different time frames related to a plurality of events. In some embodiments, user input is used to define a same geographical location and different time frames related to a plurality of events (e.g., when the same store is robbed on two or more different occasions). Each geographical location may comprise geographical coordinates of the event and/or a geographical boundary (e.g., a radius, perimeter, or the like). Each time frame may comprise a time (or approximate time) of the event (e.g., a timestamp of the event) and/or a time frame around the event (e.g., a time frame around the timestamp).

At step 604, in some embodiments, field selections are received, for example as illustrated in FIGS. 4B and 5B. The field selection includes record type or the data source selection (when there is more than one possible data source), the field from the record type or data source and optionally the coincidence match mode.

At steps 606, 608 and 610, one or more queries are generated, the data sources are identified and the one or more queries executed respectively. Each query is generated based on at least the event selections. Each query may be generated based on the event selections and the field selections (e.g., the record type or data source selection; the record type or data source selection and the field from the record type or data source; etc.). In alternative embodiments, it is possible that the user selection is helped by rules defined for the data sources, such that a field selection can be used to define the set of data sources, or the data source selection can be used to define suitable fields. Accordingly, in one or more embodiments, step 610 comprises querying at least one data source to receive occurrence records corresponding to at least some of the plurality of events according to at least said one or both of different geographical locations and different time frames of said plurality of events. In some cases, occurrence records will be received for each event. In other cases, occurrence records may not be received for one or more of the events when there are no occurrence records that meet the conditions of query (e.g., if there are no sensors in the search radius of an event).

At steps 612, 614, 615 and 616, one or more sets of occurrence records are received (Step 612) and aggregated into a dataset (Step 614). The aggregated dataset is then processed at step 615 to identify the common data field values, to produce, by grouping of the occurrence records, the coincidence entity data that can be presented as map data and/or in a table such as shown in the coincidence entity panel in the example of FIG. 5F. For example, the common data fields in FIG. 5F include the license plate (i.e. "Plate") from the LPR Read data source, the license plate field from the Arrest database and the narrative field from the Police computer-aided dispatch database. With reference to FIG. 2, it will be appreciated that module 104 can perform step 614 and then provide the aggregated dataset to module 110 which can then perform step 615. Accordingly, in one or more embodiments, step 615 may comprise comparing each value of one or more database fields from the sets of occurrence records aggregated for the events to every other value in accordance with the match mode to determine matches and to group occurrence records having matching field values to form at least one coincidence entity. The coincidence entity may correspond to any suitable data structure (e.g., a list, etc.) that stores or identifies grouped occurrence records having matching field values.

The common occurrences or coincidence entities are outputted at step 616. Accordingly, in one or more embodiments, step 615 comprises displaying to a user a visual representation of said at least one coincidence entity. The visual representation may comprise a map, for example, such as shown in FIG. 4C, 5C, 5D, 5G, or 5H. Accordingly, the occurrence records in the coincidence entity may be displayed on the map. The visual representation may comprise a table, for example, such as shown in FIG. 4C, 5F or 5G. Accordingly, the coincidence entity may be displayed in a table.

Figure 7:
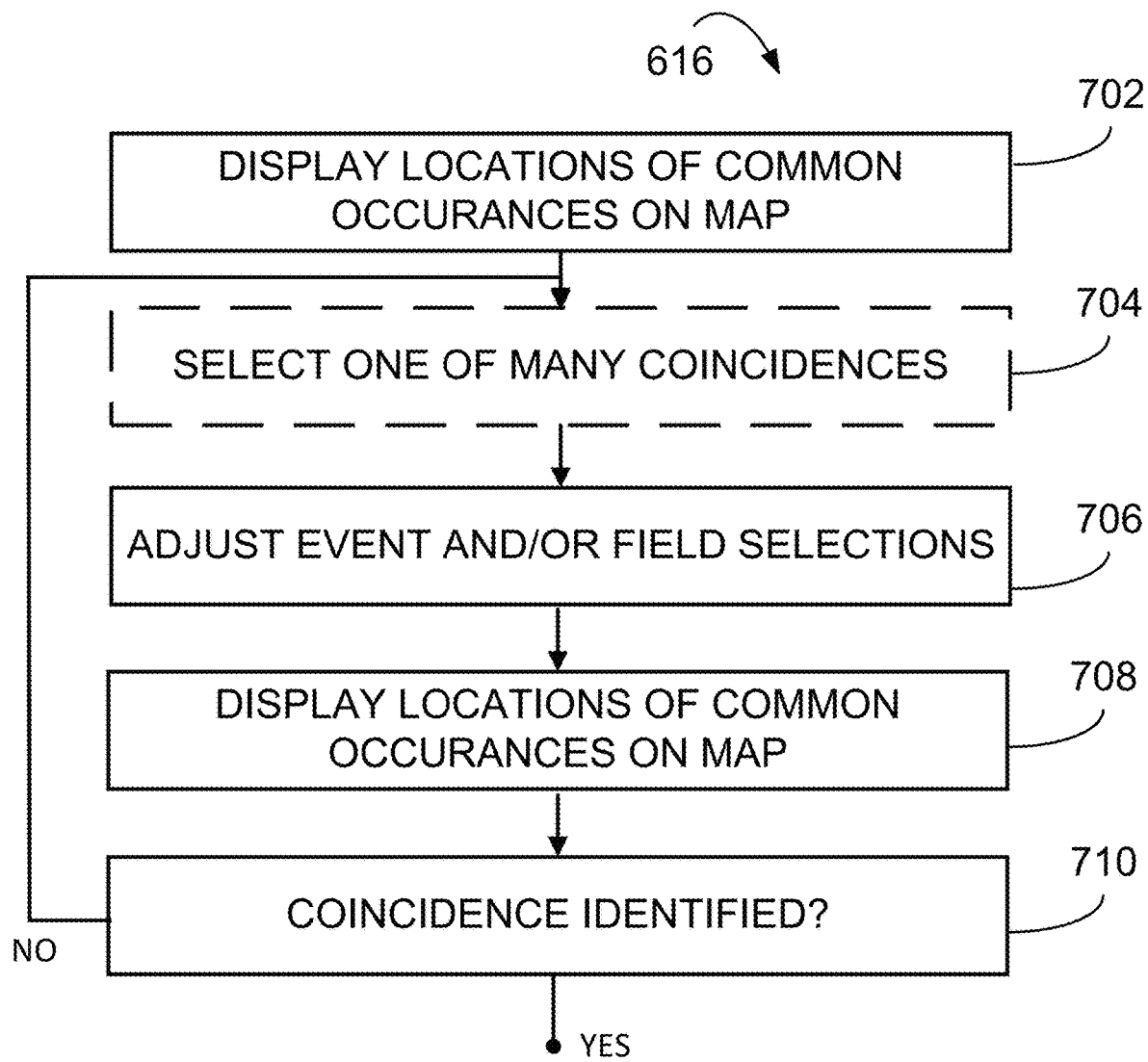
FIG. 7 is a flowchart illustrating an example method for generating a coincidence report.

An example of refining the event/field selections so as to best identify a coincidence that an investigator may want to follow up on is illustrated in FIG. 7. Step 702 is the initial output of the occurrence data, as in step 616, and can take the form of FIG. 5G as an example. In step 704, the user may select one of many coincidences when plural coincidences were found. As an example, the table of coincidences of FIG. 5F shows two coincidences based on fields that contain license plate data. In step 704, a user may hide one or more occurrences on the map display or select one with the others being hidden from the map display.

In some embodiment, the method 600 may be implemented without the user selecting the record type and related data fields. In this case, the user could add the different events that occurred (e.g., enter for each event the geographical location, the radius, the timestamp and the time range) to see if there are any common occurrences or coincidences, which could then be displayed in a table and/or on the map. In this example, queries may be generated for a plurality of data sources available to the system 100, and broadcasted to these data sources, which return sets of occurrence records meeting the conditions of the queries that can then be grouped into any common occurrences or coincidences (which may also be referred to as "coincidence entities"). It should be appreciated that this may assist an investigator or other user in their investigation as they may be able to easily add the different events and then request any common occurrences or coincidences. These common occurrences or coincidences may be of different types, and this may aid the investigator or other user in their investigation without having to generate complex queries or may help in further refining their search for common occurrences or coincidences.

In some embodiments, the grouping at step 615 comprises matching values of the at least one field of at least a first occurrence record from a first data source of two or more data sources with at least a second occurrence record from a second data source of the two or more data sources. For example, the first data source may be a LPR record data source and the second data source may be a CAD record data source. In this example, this may allow for a license plate number from a LPR record to be matched with a license plate number of a CAD narrative of a CAD record.

In some embodiments, the one or more markers corresponding to sensor locations (e.g., locations of one or more LPR cameras, locations of one or more surveillance cameras, locations of one or more access control readers or access point, and/or etc.) defined by one or more of the data source(s) 112 may be shown on the map. The sensors may comprise one or more fixed and/or mobile LPR cameras, one or more surveillance cameras, one or more access control readers, one or more gun shot sensors, one or more microphones, one or more alarm panels, one or more door sensors, one or more light sensors, and/or any other suitable sensor. The one or more markers corresponding to sensor locations may be shown outside and/or inside of the boundary marker of the different geographical locations related to the events. It should be appreciated that the markers may help the user choose the different geographical locations related to the events. For example, if a LPR camera is position along a highway, the user may want to adjust the geographical location of the search to exclude this LPR camera from the search, as it may have too many LPR records and may not be useful for identifying a coincidence. By way of another example, if a LPR camera is located closely outside of the initial boundary (e.g., radius) set by the user, the user may want to adjust the geographical location associated with the event (e.g., radius) to include a specific sensor near the event at issue, which would have otherwise been excluded from the search and could provide useful information for identifying a coincidence. By way of yet another example, the user may adjust the time frame associated with a given event to include or exclude a mobile LPR camera that was near the geographical location of the event for a limited period of time. Accordingly, the user may adjust the geographical location and/or the time frame to include and/or exclude specific sensors.

In some embodiments, the at least one field that value matches in multiple occurrence records may be highlighted. For example, if a license plate number is causing a match it may be highlighted. By way of another example, a name of an owner of a vehicle may be highlighted when it is the field that is causing the match, such as when a person owns multiple vehicles there may be different license plate numbers detecting as occurring in the geographical location and within the time frame that are associated with a common owner.

In some embodiments, multiple occurrence records having matching field values may occur in a same region or perimeter of an event. For example, the radius around a given event may have 5 occurrence records having the same license plate number. The user may be able to look at each occurrence record to see the timestamp of each of these occurrence records. This may be useful to see if this vehicle entered into the area or radius around the event prior to the time of the event and exited the area or radius of the event after the time of the event. This may also be useful to see if this vehicle was circling the area of the event (e.g., a car thief circling a parking lot over a period of time looking for a specific vehicle). In some embodiments, the method 600 may detect that one or more occurrence records that occur prior to the time of the event and one or more occurrence records that occur after the time of the event, and indicate in the generated coincidence entity which occurrence records occur prior to the time of the event and which occurrence records occur after the time of the event (e.g., occurrence records occur prior may be highlighted in one color and occurrence records occur after may be highlighted in a different color, or any other suitable visual representation). In some embodiments, the method 600 may detect that ordering in time of occurrences of multiple occurrence records and indicate this in the generated coincidence entity.

Figure 8:
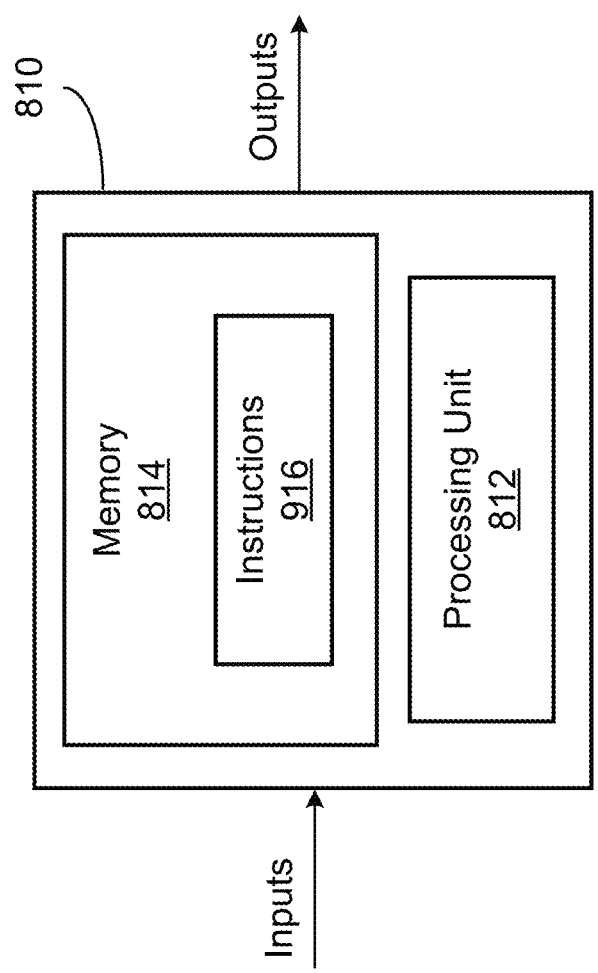
FIG. 8 is a schematic diagram of a computing device.

With reference to FIG. 8, the method 600 may be implemented by one or more computing devices, such as a computing device 810 comprising a processing unit 812 and a memory 814 which has stored therein computer-executable instructions 816. Each of the system 100 and the client device 200 may each be implemented by and/or comprise at least one computing device, such as the computing device 810.

The processing unit 812 may comprise any suitable devices configured to implement the method 600 such that instructions 816, when executed by the computing device 710 or other 600 as described herein to be executed. The processing unit 812 may comprise, for example, any type of general-purpose microprocessor or microcontroller, a digital signal processing (DSP) processor, a central processing unit (CPU), a graphical processing unit (GPU), an integrated circuit, a field programmable gate array (FPGA), a reconfigurable processor, other suitably programmed or programmable logic circuits, or any combination thereof. The processing unit 712 may be referred to as a "processor".

The memory 814 may comprise any suitable known or other machine-readable storage medium. The memory 814 may comprise non-transitory computer readable storage medium, for example, but not limited to, an electronic, magnetic, optical, electromagnetic, infrared, or semiconductor system, apparatus, or device, or any suitable combination of the foregoing. The memory 814 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 814 may comprise any storage means (e.g., devices) suitable for retrievably storing machine-readable instructions 816 executable by processing unit 812.

The methods and systems described herein may be implemented in a high level procedural or object oriented programming or scripting language, or a combination thereof, to communicate with or assist in the operation of a computer system, for example the computing device 810. Alternatively, the methods and systems described herein may be implemented in assembly or machine language. The language may be a compiled or interpreted language. Program code for implementing the methods and systems described herein may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems described herein may also be considered to be implemented by way of a non-transitory computer-readable storage medium having a computer program stored thereon. The computer program may comprise computer-readable instructions which cause a computer, or in some embodiments the processing unit 812 of the computing device 810, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

What is claimed is:

1. A computer-implemented method of processing occurrence records for coincidence identification, the method comprising:
    receiving user input used to define at least two queries related to a plurality of events, each one of said at least two queries defining a geographical location and a time frame, wherein the time frame is different for the at least two queries;
    querying at least one data source using said at least two queries to receive at least two sets of occurrence records;
    identifying at least one coincidence entry in said at least two sets of occurrence records;
    grouping said occurrence records corresponding to said at least one coincidence entry to form at least one coincidence entity; and
    causing display of a visual representation of said at least one coincidence entity to a user.

2. The method as defined in claim 1, wherein said user input includes a coincidence match mode for at least one field in each of said at least two sets of occurrence records, and said grouping comprises matching values of said at least one field in accordance with said coincidence match mode.

3. The method as defined in claim 2, wherein said user input defines said at least one field.

4. The method as defined in claim 3, wherein said at least one field defined by said user input is used to identify said at least one data source.

5. The method as defined in claim 2, wherein said at least one data source comprises two or more data sources.

6. The method as defined in claim 5, wherein said querying comprises broadcasting queries to said two or more data sources and processing data returned from said two or more data sources.

7. The method as defined in claim 6, wherein said grouping comprises matching values of said at least one field of at least a first occurrence record from a first data source of said two or more data sources with at least a second occurrence record from a second data source of said two or more data sources.

8. The method as defined in claim 1, wherein said user input includes defining at least two geographical locations and at least two different time frames related to said plurality of events.

9. The method as defined in claim 1, wherein said querying comprises broadcasting said at least two queries to said at least one data source and processing data returned from said at least one data source.

10. The method as defined in claim 1, further comprising repeating said receiving, said querying, said identifying, said grouping and said displaying with refined user input for at least one of said at least two queries.

11. The method as defined in claim 1, further comprising receiving user input to hide said visual representation of at least one of said at least one coincidence entity.

12. The method as defined in claim 1, wherein said displaying to a user a visual representation of said at least one coincidence entity comprises presenting a map.

13. The method as defined in claim 12, wherein said displaying comprises placing a symbol on said map corresponding to said at least one data source at a location associated with said occurrence records of said at least one coincidence entity.

14. The method as defined in claim 13, wherein said symbol includes a balloon containing details from said occurrence records of said at least one coincidence entity.

15. The method as defined in claim 12, wherein said displaying comprises placing a boundary marker of said geographical location of said each of the at least two queries related to said plurality of events on said map.

16. The method as defined in claim 15, wherein said displaying comprises placing, on said map, one or more markers corresponding to sensor locations defined by said at least one data source of said boundary marker of said geographical location of said each of the at least two queries related to said plurality of events, said markers helping the user choose said different geographical locations related to said plurality of events.

17. A computer-readable non-transitory memory storing instructions executable by a computer device to perform:
receiving user input used to define at least two queries related to a plurality of events, each one of said at least two queries defining a geographical location and a time frame, wherein the time frame is different for the at least two queries;
querying at least one data source using said at least two queries to receive at least two sets of occurrence records;
identifying at least one coincidence entry in said at least two sets of occurrence records;
grouping said occurrence records corresponding to said at least one coincidence entry to form at least one coincidence entity; and
causing display of a visual representation of said at least one coincidence entity to a user.

18. The memory as defined in claim 17, wherein said receiving the user input includes defining at least two geographical locations and at least two different time frames related to said plurality of events.

19. The memory as defined in claim 17, wherein said displaying to the user the visual representation of said at least one coincidence entity comprises presenting a map and placing a symbol on said map corresponding to said at least one data source at a location associated with said occurrence records of said at least one coincidence entity.

20. The memory as defined in claim 19, wherein said displaying comprises placing a boundary marker of said geographical location of said each of the at least two queries related to said plurality of events on said map.

* * * * *